(12) United States Patent
Borch-Jensen et al.

(10) Patent No.: US 9,431,803 B2
(45) Date of Patent: Aug. 30, 2016

(54) CABLE ASSEMBLY CURVATURE LIMITER

(75) Inventors: Niels Joergen Borch-Jensen, Billum (DK); Johnny Soerensen, Videbæk (DK)

(73) Assignee: SIEMENS AKTIENGESELLSCHAFT (DE)

( * ) Notice: Subject to any disclaimer, the term of this patent is extended or adjusted under 35 U.S.C. 154(b) by 75 days.

(21) Appl. No.: 14/368,553

(22) PCT Filed: Jul. 19, 2012

(86) PCT No.: PCT/EP2012/064158
§ 371 (c)(1),
(2), (4) Date: Jun. 30, 2014

(87) PCT Pub. No.: WO2013/113408
PCT Pub. Date: Aug. 8, 2013

(65) Prior Publication Data
US 2014/0345245 A1     Nov. 27, 2014

(30) Foreign Application Priority Data
Feb. 2, 2012 (EP) .................... 12153686

(51) Int. Cl.
F16G 13/16 (2006.01)
H02G 3/04 (2006.01)
H02G 1/10 (2006.01)

(52) U.S. Cl.
CPC ............ *H02G 3/0475* (2013.01); *F16G 13/16* (2013.01); *H02G 1/10* (2013.01); *Y10T 29/49826* (2015.01)

(58) Field of Classification Search
CPC ...... H02G 3/0475; H02G 1/10; F16G 13/16; Y10T 29/49826
USPC .......................................... 59/78.1
See application file for complete search history.

(56) References Cited

U.S. PATENT DOCUMENTS

| 8,024,916 B2 * | 9/2011 | Kuebel | F16G 13/16 248/49 |
|---|---|---|---|
| 2009/0272093 A1 | 11/2009 | Kuebel | |
| 2010/0196100 A1 | 8/2010 | Soe-Jensen | |

FOREIGN PATENT DOCUMENTS

| EP | 2116742 | * | 4/2009 |
| EP | 2 463 547 A1 | | 6/2012 |
| JP | S50 17790 U | | 2/1975 |
| JP | S51 104396 U | | 8/1976 |
| WO | 2004088810 A1 | | 10/2004 |

OTHER PUBLICATIONS

International Search Report and Written Opinion; PCT/EP2012/064158; International Filing Date: Jul. 19, 2012; Siemens Aktiengesellschaft; 16 pgs.

* cited by examiner

*Primary Examiner* — David B Jones
(74) *Attorney, Agent, or Firm* — Schmeiser Olson & Watts LLP

(57) ABSTRACT

The present invention concerns a cable assembly curvature limiter for limiting the curvature of a cable assembly in a transition from a vertical direction to a horizontal direction. The invention further concerns an offshore facility comprising the cable assembly curvature limiter and a method of suspending the cable assembly from an upper level of an offshore facility.

17 Claims, 9 Drawing Sheets

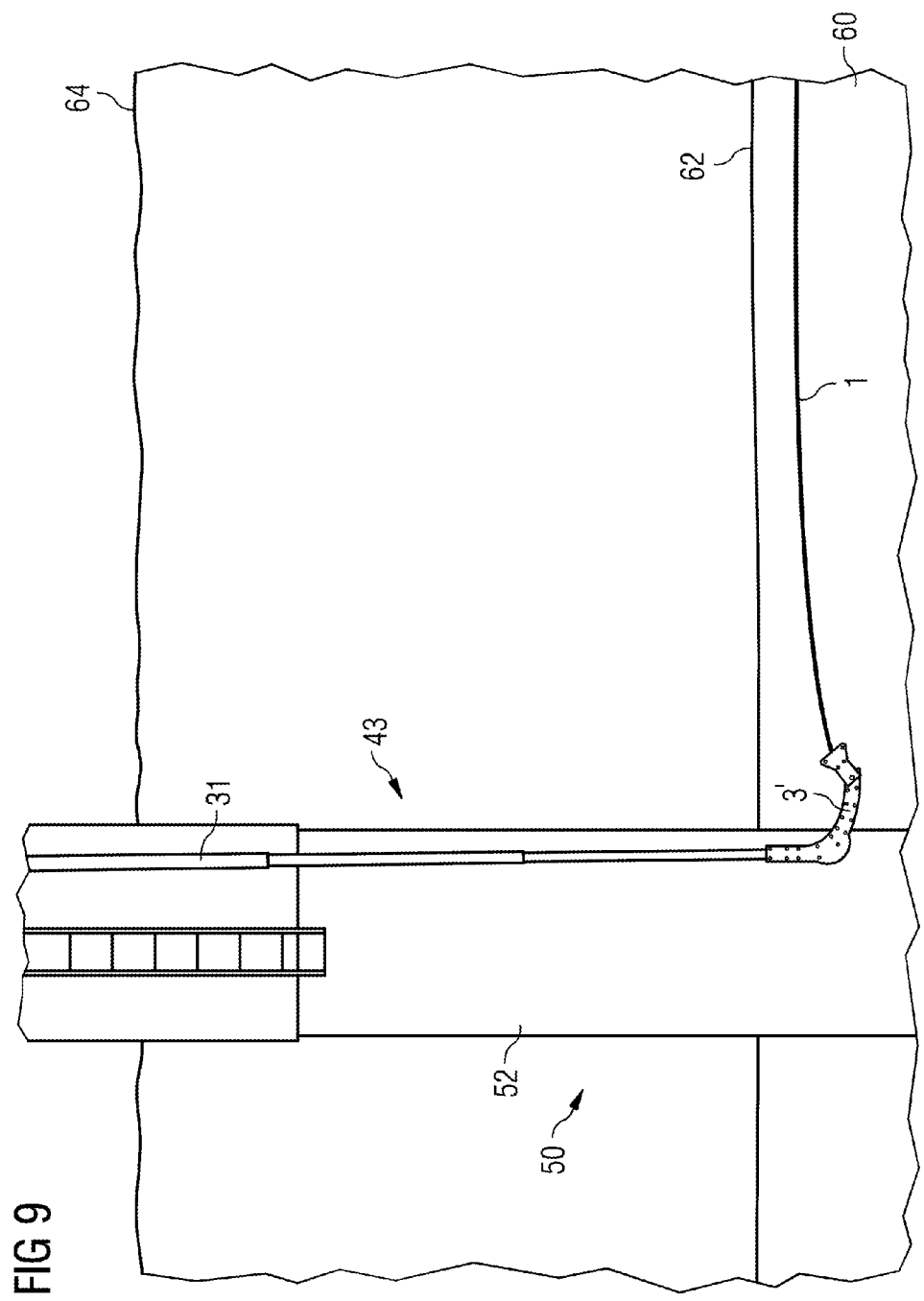

CABLE ASSEMBLY CURVATURE LIMITER

CROSS-REFERENCE TO RELATED APPLICATIONS

This application claims priority to PCT Application No. PCT/EP2012/064158, having a filing date of Jul. 19, 2012, based off of EP Application No. 12153686.6 having a filing date of Feb. 2, 2012, the entire contents of which are hereby incorporated by reference.

FIELD OF TECHNOLOGY

The following relates to a cable assembly curvature limiter for effecting a transition of a cable assembly from an essentially vertical direction to an essentially horizontal direction on the seabed. The invention further concerns an offshore facility comprising the cable assembly curvature limiter and a method of guiding a cable assembly from an essentially vertical direction to an essentially horizontal direction, preferably of suspending the cable assembly from an upper level of an offshore facility.

BACKGROUND

For providing an electrical connection between offshore facilities such as an array of wind turbines in a wind park or an oil rig or between an offshore facility and an onshore power plant sea cables are used. A sea cable is usually guided vertically from a pillar of a first offshore facility to an essentially horizontal course on the sea bed or below the sea bed and is then guided vertically to a pillar of a second offshore facility. According to their specific structure and materials, sea cables can tolerate being bent up to a specific minimal bending radius. A more severe bending could result in a damage of an electrical cable assembled in the sea cable. Thus, a sea cable is usually guided by means of a J-shaped tubing arrangement restricting the bending of the sea cable at the critical point of transition from vertical to horizontal. Erosion of the seabed around the lower end of the J-tube caused by tide, currents or waves can lead to a varying distance between a fixing point of the cable assembly at an offshore facility and a point where a suspended cable assembly reaches the seabed. Due to this fact, curvature limiters comprising a variable curvature are applied for compensating geometrical alterations of the course of the sea cable caused by varying ground levels.

A curvature limiter comprising a variable curvature is disclosed in EP 1 616 377 B1. A sea cable being guided from vertical to horizontal is secured against excessive bending by means of an arrangement comprising several pipe segments which can be pivoted relative to one another so far that the bending of a cable inserted into the pipe segments does not fall below the minimum bending radius of the cable.

A second type of curvature limiter comprising a variable curvature is disclosed in EP 2 158 654 B1. It comprises a first, J-shaped tube guiding a sea cable from a vertical to a horizontal direction, a second, rigid tube and a third, flexible tube both extending in an essentially horizontal direction on or below the seabed. The first and the second tube are connected by means of a hinged element which allows both tubes to pivot relative to one another. This mechanism allows a sea cable mounted to an offshore facility and inserted in the tubing arrangement being guided to a horizontal course on or below the seabed without being exposed to an excessive bending radius.

The curvature limiters disclosed in EP 1 616 377 B1 and in EP 2 158 654 B1 provide a reliable protection of a sea cable arranged within them. However, due to a variety of different components, the process of assemblage is complex. Further, the process of installing a sea cable within these types of curvature limiters is difficult and dangerous because it requires the use of divers and/or remotely operated vehicles.

SUMMARY

An aspect relates to a cable assembly curvature limiter which is simple to manufacture and which allows an easy and secure process of installing a cable assembly within the curvature limiter.

The term "sea cable" is understood as a heavily armoured electric cable. In differentiation from that term, the following description uses the expression "cable assembly" for denoting either a cable protected by a surrounding hose or just a hose without a cable inserted into it. The cable as possible part of a cable assembly is realized for transmitting any kind of signal or energy or fluid. It may for example be a power transmission cable arranged between a generator of an offshore wind turbine and an onshore transformer station or between an onshore power plant and an offshore oil rig.

In this context the expression "cable assembly curvature limiter" is used for a curvature limiter which may be used for installing a cable assembly flexibly at an essentially vertical supporting structure, preferably of an onshore and/or offshore facility and/or at a cable assembly holding apparatus.

An "offshore facility" can comprise a wind turbine or an oil rig or any type of subsidiary structure positioned in the sea or in a lake.

The criteria "bending radius" together with "bending angle" define a "curvature" of a cable assembly arranged within a curvature limiter. The term "bending angle" in this context defines an angle between a main direction of a first section of a curvature limiter and a main direction of a last section of a curvature limiter. The term "maximum bending angle" defines an angle between a main direction of a first section of a curvature limiter and an extreme direction of a cable assembly exiting a last section of a curvature limiter, which extreme direction is determined by a minimum "bending radius" of a cable assembly.

According to described aspects, the cable assembly curvature limiter is designed for limiting the curvature of a cable assembly in a transition from an essentially vertical direction to an essentially horizontal direction. It differs from the state-of-the-art by comprising a flexible open frame for accommodating the cable assembly and a number of retaining elements within the open frame arranged to retain the cable assembly within the curvature limiter. The curvature limiter is preferably realized for being arranged at or nearby an offshore facility in order to support a cable assembly on its transition from an upper level of an offshore facility to the sea bed. The terms "essentially vertical direction" and "essentially horizontal direction" of a cable assembly imply that a main direction of the cable assembly is vertical or horizontal. This definition comprises the possibility that sections of the cable assembly can follow a meandering direction and/or can take a course partially deviating from a main direction. Related to a preferred scenario, an essentially vertical direction comprises a direction essentially parallel to a pillar or a set of pillars or any kind of base structure of the offshore facility, which pillar or set of pillars or base structure stands upright on the seabed, which position can be angular relative to the seabed. An essentially horizontal direction of the cable assembly comprises a direction essentially parallel to the ground, which can be the seabed or the bed of a lake. It can also comprise alterations of a horizontal direction caused by an uneven surface of a ground comprising holes or raised elements.

The curvature limiter ensures to maintain a specific minimum bending radius of a cable assembly held by the curvature limiter and it protects the cable assembly against damage induced by excessive bending. The curvature limiter can however basically be used for any type of cable assembly and can be installed at any type of onshore and/or offshore facility. The curvature limiter can comprise interfaces for being connected to a subsidiary structure which can be then connected for example to a facility. Such subsidiary structure can comprise a holding apparatus for holding a cable assembly suspended at an upper level of a facility.

The flexible open frame of the curvature limiter can comprise rigid and/or hinged segments and/or can comprise an elastic material. Moreover, the open frame preferably comprises at least two openings for introducing a cable assembly into an interior space of the curvature limiter and/or for removing it. An "open frame" means that an interior space realized for accommodating the cable assembly within the curvature limiter is not enclosed completely by a frame part. To this end, the open frame is preferably essentially open along at least one side. In this context, the term "essentially open" is to be understood to mean that at least 50% of a respective long side of the open frame is empty space and therefore exposed to air or water. For instance, the interior space of the curvature limiter may be bounded by frame parts on three long sides. As another example, the flexible open frame can comprise a series of openings along one or more long sides. As a further example, the open frame can be realized as a cage or framework. More preferably, the open frame comprises two opposing long sides made of frame parts and connected together by spacers to expose the interior space of the curvature limiter. Regardless of the way in which a curvature limiter is realized, such openings on a long side of the open frame are preferably large enough to give access to the interior space of the curvature limiter for divers and/or remotely operated vehicles for performing maintenance work in the interior of the curvature limiter. An open frame thus provides the benefit of convenient monitoring of a cable assembly loaded in a curvature limiter already arranged at the seabed. Also, the procedure of loading the cable assembly in the curvature limiter can be greatly simplified by the open frame of the curvature limiter. Thus, it can greatly simplify procedures of assembly and maintenance. The interior space is preferably realized as an open duct for accommodating the cable assembly. The interior space preferably comprises a curved shape which is advantageous compared to an angular or rectangular shape because a minimum bending radius of a cable assembly arranged within the interior space, which minimum bending radius is usually inherent to cable assemblies, is maintained easily. The mentioned retaining elements within the flexible open frame of the curvature limiter can be realized as bridges or beams connecting frame parts of the curvature limiter. Thus, they can lead to a reduction of the size of openings of the frame and prevent the cable assembly from slipping out of the curvature limiter due to tide, currents and. The retaining elements can comprise rigid and/or hinged and/or elastic elements, for example rollers.

With reference to the cable assembly curvature limiter just described, additionally described aspects also concern an offshore facility comprising such curvature limiter for securing a cable assembly suspended at an upper level of the offshore facility and supporting it on a transition from a vertical course to a horizontal course on the seabed. The curvature limiter is preferably arranged at the seabed in a position nearby a foundation structure of the offshore facility.

Further, the described aspects concern a method of method of guiding a cable assembly from an essentially vertical direction to an essentially horizontal direction, preferably for suspending a cable assembly from an upper level of an offshore facility, which method comprises the following steps that can be carried out in any desired sequence:

A cable assembly curvature limiter is connected an essentially vertical structure, preferably to the offshore facility, which curvature limiter comprises a flexible open frame for accommodating the cable assembly and a number of retaining elements within the open frame arranged to retain the cable assembly within the curvature limiter.

The method of suspending a cable assembly from an upper level of an offshore facility further comprises the step of arranging the cable assembly within the described curvature limiter.

The cable assembly is preferably installed within the curvature limiter after assembling the curvature limiter. Preferably the cable assembly is inserted through a main opening at its top and/or bottom side so that a minimum bending radius of the cable assembly is maintained. The cable assembly is preferably installed within the curvature limiter above the water surface.

Particularly advantageous embodiments and features of the described aspects are given by the dependent claims, as revealed in the following description. Thereby, features revealed in the context of any one of the embodiments of the cable assembly curvature limiter may also be realized in the context of the offshore facility and/or method of guiding or suspending a cable assembly according to the invention unless the contrary is explicitly stated and vice versa.

According to further described aspects, the above-mentioned curvature limiter comprises a variable curvature, wherein a minimum radius of curvature of the curvature limiter is at least as great as a minimum bending radius of the cable assembly. A variable curvature of the curvature limiter proves advantageous because a cable assembly accommodated within the curvature limiter can be bended to a wide range of directions using a single apparatus. A limited variable curvature of the curvature limiter contributes to a protection of an inserted cable assembly by avoiding a possibly damaging bending radius. Preferably, the curvature limiter comprises a curvature at least as great as the minimum bending radius of the cable assembly accommodated within the curvature limiter. This determines the width and curvature of an interior space within the curvature limiter, through which interior space a cable assembly proceeds. The width of the interior space is preferably at least as great as the diameter of the cable assembly to be inserted. The curvature limiter preferably comprises a means for limiting the variable curvature to a predefined range.

If the curvature limiter is installed on or below the surface of the seabed nearby an offshore facility, a variable curvature proves to be particularly advantageous. The risk of an excessive bending of a cable assembly in an area where it exits an opening of a curvature limiter and proceeds on or below the seabed is given by varying ground levels which can be observed around the foundation structure of offshore facilities and thus in an area, where a curvature limiter is usually positioned. A curvature limiter comprising a variable curvature can provide an adaptation to different topographies when being laid down on the ground.

These general observations can be related to advantages of a variable curvature in a concrete example: The direction of a cable assembly exiting a mouth of a curvature limiter relative to a surface of the seabed which the cable assembly is impinging on can lead to a deviation of the cable assembly comprising a possibly damaging bending angle. By means of a curvature limiter comprising a variable curvature, the bending angle of a cable assembly impinging on the seabed can be reduced to a non-damaging extent by adapting the geometry of the whole curvature limiter or at least of a segment of it in to the surface beneath.

Such adaptation cannot be provided by a curvature limiter comprising a fixed curvature. Different types of cable assemblies comprise display different qualities, for example according to the materials used, the thickness of singular layers and the projected purpose. As different types of cable assemblies can be arranged within a curvature limiter, a limitation of a variable curvature of a curvature limiter is preferably chosen according to a specific minimum bending radius of an individual type of cable assembly to be inserted.

Referring to the embodiment of a minimum radius of curvature of the curvature limiter, being at least as great as a minimum bending radius r of the cable assembly, a minimum bending radius of the cable assembly (which defines the maximum allowed bending of the cable assembly, which guarantees that a damaging of the cable assembly is prevented) is preferably 1 meter, more preferably 1.5 meters and most preferably 1.7 meters. The minimum bending radius of the cable assembly is generally defined according to the specifications and purpose of an individual project, which may require e. g. a one-conductor or a multi-conductor cable assembly. The minimum bending radius r determines the minimum size of the curvature limiter such that an interior space of the curvature limiter serving as a duct comprises a length of at least $\frac{1}{4} \cdot 2 \cdot \Pi$. The width of the interior space of the curvature limiter, in which the cable assembly is to be accommodated, is not necessarily equal to the diameter of the cable assembly. As a width of the interior space which is greater than the diameter of the cable assembly leads to a plurality of possible curvatures of the cable assembly when being accommodated within the interior space, the bending radius of a cable assembly can fall below its minimum bending radius, although the curvature of an interior space of the curvature limiter equals or exceeds a curvature equivalent to the minimum bending radius.

According to further described aspects, the flexible open frame of the curvature limiter comprises a plurality of interconnected hinged segments, wherein a degree of freedom between adjacent hinged segments is chosen to limit the curvature of the cable assembly. Hinged segments are a solution for providing a flexible frame which is easy to be realized. Preferably, each hinged segment comprises an interior space realized for accommodating the cable assembly, which interior space comprises a width being at least as great as a diameter of the cable assembly. The hinged segments are preferably connected to each other by an axle serving as a common rotation axis and providing a two-dimensional flexibility. Alternatively, the hinged segments can be connected by a spherical joint providing a three-dimensional flexibility or by an elastic connective means. Preferably, the rotation angle of a hinged segment relative to an adjacent hinged segment is limited to a predefined range by a stopper. It is particularly advantageous to limit the rotation angle to such degree that a cable assembly being inserted in cavities of adjacent hinged segments is at maximum bended to a curvature that equals a minimum bending radius of the specific type of inserted cable assembly. Preferably, the curvature of the cable assembly is chosen such that it corresponds to a bending radius greater than a minimum bending radius of the cable assembly.

Preferably, the curvature of the cable assembly accommodated within the curvature limiter is continuous, i.e. a meandering course of the cable assembly is preferably avoided. This meandering course can result of a width of the interior space of the curvature limiter being as great as the diameter of the cable assembly. A bending of the cable assembly may then follow the changing, but essentially meandering geometry of the cavities of the rigid segments and/or hinged segments of the curvature limiter, which can lead to an excessive and possibly damaging bending. For providing a continuous curvature of the cable assembly, the width of the interior space or duct of the curvature limiter is preferably greater than the diameter of the cable assembly accommodated within it. This may lead to a more secure handling of the curvature limiter.

According to a preferable aspect, the flexible open frame of the curvature limiter comprises at least three, more preferably six or more interconnected hinged segments, wherein adjacent hinged segments are connected such that a hinged segment can rotate relative to an adjacent hinged segment preferably by at most 30°, more preferably by at most 20° and most preferably by at most 15°. The rotation angle of a number of hinged segments relative to each other is generally defined according to the specifications and purpose of an individual project. As described above, interconnected hinged segments of a flexible open frame provide a duct for accommodating the cable assembly by an interconnection of their cavities. The positions of hinged segments relative to adjacent hinged segments determine the curvature of a cable assembly accommodated in the duct. When interconnecting, for example, six hinged segments, wherein each hinged segment is rotated about 15° relative to an adjacent hinged segment, a total rotation angle of 90° is reached. This rotation angle equals a bending angle of an inserted cable assembly. According to a preferable embodiment of the invention, 90° is a minimum bending angle of a cable assembly supported on the transition from a vertical to a horizontal direction at an offshore facility, which bending angle can be reached rotating each of six interconnected hinged segments about a preferable maximum rotation angle of 15°. Said hinged segments can be connected such that they can be moved relative to each other two-dimensionally but they can also be realized for being movable relative to each other three-dimensionally, for example by means of spherical joints. Preferably, the flexible open frame of the curvature limiter comprises six to eight hinged segments rotatable relative to each other two-dimensionally about 15° at maximum. This preferable embodiment comprises a total maximum rotation angle amounting to 120°. A minimum rotation angle of interconnected hinged segments is 0° not depending on the number of interconnected hinged segments.

According to a preferred aspect, the hinged segments being part of the flexible open frame of the curvature limiter comprise triangular frame sections. These frame sections are connected to each other in order to adapt to a curvature of the cable assembly, which curvature is at least as great as the minimum bending radius of the specific type of cable assembly inserted into the curvature limiter. Triangular frame sections provide a constructive benefit as they are easy to manufacture and can be combined as part of a modular construction. Preferably, the flexible open frame of a curvature limiter comprises a plurality of triangular frame sections. A modular frame piece, which can be a hinged or a rigid segment of a curvature limiter, preferably comprises two triangular frame parts, which are interconnected and comprise retaining elements. An interior space established by triangular frame parts positioned on opposite sides, and by retaining elements positioned on different opposite sides is preferably at least as great as the diameter of a cable assembly which is to be accommodated within the interior space. Two triangular frame parts of a hinged and/or rigid segment are preferably connected to each other by connective elements being fixed at corner areas of the triangular frame parts. Consequently, connective elements can serve as retaining elements if a cable assembly is inserted in the interior space which is confined by connective elements and triangular frame parts.

Preferably, a plurality of said modular frame pieces is interconnected such that each modular frame piece can rotate relative to an adjacent modular frame piece about an axle which is defined by one of said connective elements of a modular frame piece. A rotation angle of said modular frame pieces relative to each other can vary freely within a range of possible rotation angles, which is limited to a degree, which at the most is equivalent to a minimum bending radius of a cable assembly. If, according to a preferable intended purpose, a curvature limiter is installed at the seabed with a cable assembly being accommodated within it, the rotation angle of said modular frame pieces relative to each other is determined by gravity pulling down the cable assembly and the hinged segments of the curvature limiter and by the topography of the ground, which is influencing the geometry of the whole arrangement. Preferably, in each state of the process of installing the cable assembly into a curvature limiter and also in a final state of assembly a curvature of the cable assembly is accomplished which is at least equivalent or greater than its minimum bending radius.

Alternatively or in addition to the preferred embodiments described before, the curvature limiter preferably comprises a rigid curved segment realized such that the curvature of said rigid curved segment is at least as great as a minimum bending radius of the cable assembly which is to be accommodated in the curvature limiter. A rigid curved segment as part of a curvature limiter can replace a series of interconnected hinged segments if a cable assembly is to be guided in a predefined curvature and with a predefined bending angle. The rigid curved segment comprising said curvature can offer a reliable protection of an inserted cable assembly against being bended in an excessive and possibly damaging bending angle. The use of a rigid curved segment can provide a benefit in special cases under extreme environmental conditions because the curvature limiter may then comprise less hinged parts that can be damaged by corrosion and/or soiling. Apart from that, a rigid curved segment may be easier to manufacture and to assemble compared to a series of hinged segments. Said rigid curved segment preferably comprises two curved frame sections being connected by connective interfaces. These connective interfaces preferably serve as retaining elements when a cable assembly is inserted in an interior space confined by connective interfaces and triangular frame parts. Preferably, the rigid curved segment comprises a further connective interface for connecting a single hinged segment or a plurality of hinged segments to an end section of the rigid curved segment, wherein the cavities of hinged segments preferably interface with the interior space of the rigid curved segment such that a cable assembly accommodated in the rigid curved segment proceeds into an interior space of the hinged segment.

According to a preferred aspect, the curvature limiter comprises at least a hinged segment connected to an end section of the rigid curved segment, which hinged segment is rotatable relative to the rigid curved segment such that a bending radius of the cable assembly at the lower end of the curvature limiter is at least as great as a minimum bending radius of said cable assembly. This construction is advantageous because a curvature limiter comprising a rigid curved segment combined with a hinged segment fulfils the purpose of supporting a cable assembly on a way from a vertical to a horizontal direction while being able to keep a curvature of an inserted cable assembly which is greater than a possibly damaging bending radius of said cable assembly. More than that, this construction comprises a variable curvature provided by the rotatable hinged segment, wherein the rotation angle is limited to a range according to a minimum bending radius of the cable assembly. An advantage of this construction of a curvature limiter consists in the possibility of self-adaptation to different topographies when the curvature limiter is positioned at the ground of the sea or a lake, which self-adaptation is enabled through gravity. The construction thus combines a possible self-adaptation and a reliable protection of an inserted cable assembly. An entirely rigid curved frame can lead to an excessive bending of an inserted cable assembly, for example, if a hollow of a scour hole—scour holes frequently emerge around pillars or base structures of offshore facilities—forces a cable assembly to bend upwards or downwards on the point of exiting the mouth of a curvature limiter. This could lead to a breakage of a delicate electric cable as part of a cable assembly. The combination of a rigid curved segment and a hinged segment provides the benefit of diminishing the bending angle while maintaining the actual bending radius of a cable assembly being inserted in such type of curvature limiter, which actual bending radius is greater than its specific minimum bending radius.

For limiting the rotation angle, the rigid curved segment and/or the hinged segment preferably comprises a stopper. Said hinged segment preferably comprises two frame sections connected by connective interfaces. These connective interfaces preferably serve as retaining elements when a cable assembly is accommodated within an interior space of the hinged segment, which interior space is confined by connective interfaces and frame sections. Preferably, each frame section of a hinged segment is connected to a frame section of a rigid curved segment. More preferably, the pivotable connection is established by an axle serving as a common rotation axis.

Referring to the described preferred embodiment of a curvature limiter comprising a hinged segment connected to a lower end of a rigid curved segment, the rigid curved segment is realized such that a bending angle of the cable assembly accommodated within it is limited. The bending angle of an interior space or cable assembly duct of the rigid curved segment, and therefore of the cable assembly, is generally defined according to the specifications and purpose of an individual project. Preferably, this bending angle is at least 0°, more preferably at least 60°, and most preferably at least 80°. On the other hand, this bending angle is preferably at most 180°, more preferably at most 120° and most preferably at most 100°. This solution is advantageous as usually a bending radius of a cable assembly suspended at an offshore facility, which cable assembly hangs downwards to the seabed in a vertical direction and is guided to a horizontal direction on the seabed, is essentially rectangular. The term "essentially rectangular" expresses that a first main direction of a cable assembly and a second main direction relate to each other by an angle of approximately 90°. This definition comprises the possibility, that sections of the cable assembly can follow a meandering direction and/or can take a course partially deviating from a main direction. An adaptation of the curvature limiter to an uneven ground level, which can for example be caused by scour holes, can be reached by one or a plurality of additional hinged segments connected to an end section of the rigid curved segment.

According to a further preferred aspect, a retaining element of the curvature limiter comprises a roller for facilitating a movement of the cable assembly being accommodated in the curvature limiter. This embodiment is particularly advantageous regarding the process of introducing and/or removing a cable assembly into/from a curvature limiter. Rollers can reduce the friction between the surfaces of the interior space of the curvature limiter and the cable assembly, which friction may occur when the cable assembly is moved inside the interior space. Thus, rollers can contribute to an easier process of installing a cable assembly within a curvature limiter especially when the curvature limiter is positioned below the water surface. Preferably, the employment of rollers leads to a reduced use of divers and/or remotely operated vehicles used to support the process of loading the cable assembly in an interior space of a curvature limiter. The retaining elements of a curvature limiter preferably comprise a plurality of rollers so that the duct in the interior space of the curvature limiter, which duct is designed to accommodate and to guide the cable assembly, is essentially constituted by rollers.

Preferably, a roller exhibits a circular shape resembling a disc, whereby a rotation axis runs through the virtual center of the disc and is positioned in an essentially rectangular angle relative to the rotational direction of the disc-like roller. Preferably, a roller comprises a U-shaped notch along its circular outer surface, which notch is designed to accommodate a cable assembly. The notch is preferably concave and designed for adapting to the outer shape of the cable assembly. For example, the shape of the notch can complement the round shape of the cable assembly inserted into the duct of the curvature limiter. Apart from that, a roller can preferably rotate freely, i.e. in two opposite directions about a rotation axle, which rotation axle is preferably securely connected to frame parts of a hinged segment and/or to a rigid segment of the curvature limiter. Alternatively, the roller may be connected firmly to the rotation axle, wherein the axle is connected to a frame part of a hinged segment and/or a rigid segment such that it is freely rotatable. In any case, said axle may be connected to the hinged or rigid segments such that at least one of two adjacent hinged or rigid segments is rotatable about the axle. Thus, the roller can be positioned coaxial to the rotation axis of adjacent hinged and/or rigid segments. Preferably, the interior space or cable assembly duct of the curvature limiter is confined by rollers positioned opposite to each other such that a distance between the inner surfaces of the notches of two rollers is at least as great as the diameter of a cable assembly inserted into the duct of the curvature limiter. In this configuration the cable assembly is preferably not compressed by the rollers.

As mentioned above, a preferred embodiment of the curvature limiter comprises a rigid curved segment and a hinged segment. At least one of these segments and preferably both comprise at least two retaining elements. Retaining elements as part of a flexible open frame are advantageous because they prevent a cable assembly accommodated in the flexible open frame from slipping out. In a cross sectional view the flexible open frame of the curvature limiter preferably displays two opposite open and two opposite closed sides. Retaining elements are therefore preferably designed to bridge and/or to partially close the open sides of the open frame for retaining a cable assembly in an interior space inside the open frame. Preferably, a retaining element comprises a roller and an axle about which the roller can be rotated. As explained above, retaining elements realized as rotatable rollers reduce the friction between the inner surface of the open frame and the cable assembly when moving the cable assembly in an interior space of the curvature limiter. Consequently, if each open frame part of a curvature limiter comprises retaining elements realized as rollers, the process of installing and/or de-installing a cable assembly within a curvature limiter can be simplified considerably.

According to described aspect, the curvature limiter comprises a connective interface for mounting the curvature limiter to a supporting structure of an offshore facility and/or to a cable assembly holding apparatus for vertically supporting a cable assembly. Alternatively, the curvature limiter can be positioned in the vicinity of a point where a cable assembly exits a supporting structure of an offshore facility in order to proceed through the interior space of a curvature limiter or of a holding apparatus, wherein the curvature limiter is not connected to one of these structures. However, the possibility to establish a firm connection to a curvature limiter by means of a connective interface can prevent the cable assembly from being damaged through movements of an unfixed curvature limiter, which can be caused by tide, currents and waves and may lead to mechanical stress of the cable assembly. Thus, a connective interface contributes to a secure handling of the curvature limiter. Preferably, the connective interface is part of an end segment of the curvature limiter and is designed to connect to a counterpart being part of the supporting structure of the offshore facility or of the holding apparatus. The connection between the two connective interfaces preferably comprises an arrangement for rotating the curvature limiter two-dimensionally relative to the supporting structure or holding apparatus. Preferably, the (virtual) rotation axis is essentially parallel to the cable assembly inserted in the connected curvature limiter such that a minimum bending radius of the cable assembly is observed. Additionally, a rotation angle between two connective interfaces is limited to a range falling below a maximum torsion tolerance of the cable assembly.

Referring to the method of suspending a cable assembly from an upper level of an offshore facility by means of a cable assembly curvature limiter, the step of arranging the cable assembly in the curvature limiter is carried out at an upper level of the offshore facility. More preferably, this step is performed above the water surface. This method is advantageous as it does not require the use of divers and/or remotely operated vehicles for performing an underwater introduction process which is dangerous and time-consuming. The step of introducing a cable assembly into the curvature limiter is preferably performed from a floating facility, e.g. a vessel, positioned nearby the offshore facility. Preferably, the cable assembly is introduced into an interior space of the curvature limiter before it is connected to the offshore facility. After inserting the cable assembly into the curvature limiter and connecting it to the offshore facility, it is preferably unrolled from a cable drum positioned on board the floating facility and laid down on the seabed or flushed into the seabed.

The curvature limiter can be connected to the offshore facility via an intermediate structure of a holding apparatus designed for holding a cable assembly between an upper level of the offshore facility and the seabed. In this case, the holding apparatus is preferably mounted to a pillar, a set of pillars or a base structure of the offshore facility standing upright on the seabed. While it is possible to connect a curvature limiter to different embodiments of a holding apparatus, the curvature limiter is in a final state of assembly preferably connected to a lower opening of a holding apparatus so that a cable assembly accommodated within the holding apparatus proceeds directly into an interior space of the curvature limiter when exiting the holding apparatus. The curvature limiter can be connected to a holding apparatus before or after mounting the holding apparatus to the offshore facility. If the holding apparatus is designed as a single tube according to the state-of-the-art, the curvature limiter may be connected to it below the water surface supported by divers and/or remotely operated vehicles. If the holding apparatus is designed as a tubing arrangement comprising a telescopic mechanism, the curvature limiter is preferably connected to it above the water surface in an initial, non-extended state of the telescopic tubing arrangement. One of these embodiments of a holding apparatus or both of them can additionally comprise a longitudinal slit for moving a curvature limiter along a length of the tube, which slit is realized such that a cable assembly fits through it.

Apart from that, the step of connecting a cable assembly curvature limiter to the offshore facility comprises the steps of lowering the curvature limiter and the cable assembly to the seabed and of arranging the curvature limiter at the seabed. These steps are preferably carried out after connecting the curvature limiter to a supporting structure of the offshore facility or to a holding apparatus. Alternatively, the curvature limiter can be lowered by means of a crane positioned at the offshore facility or at a floating facility. As it is necessary to protect the cable assembly against mechanical stress and excessive bending, it is advantageous to guide the curvature limiter with a cable assembly accommodated within it when lowering the curvature limiter from an upper level of the offshore facility down to the seabed. A guiding device can be part of a supporting structure of the offshore facility or of a holding apparatus. Preferably, the curvature limiter is connected to a holding apparatus comprising a longitudinal slit which can serve as a guiding rail for moving the curvature limiter up and/or down along the length of the holding apparatus while the cable assembly is accommodated within the curvature limiter. Thus, the cable assembly is protected against uncontrolled movements which can be caused by wind, waves or currents and can lead to a possibly damaging bending of the cable assembly. A movement of the curvature limiter along a length of the holding apparatus can for example be controlled by an actuating means comprising a wire and a winch for pulling up and/or letting down the curvature limiter by means of the wire attached to it.

After lowering the curvature limiter to the seabed, it can be laid down on the surface of the seabed or flushed into the seabed. Preferably, the curvature limiter is connected to the holding apparatus such that it is positioned upright with the cable assembly entering an interior space of the curvature limiter at an opening situated at a top section of the curvature limiter and entering the interior space at an opening situated at a bottom section of the curvature limiter. The curvature limiter can be fixed to the holding apparatus in a manner that it cannot be moved in a vertical direction. However, it is preferably connected such that it can be moved in a vertical direction along the holding apparatus for adapting and/or self-adapting its position to varying ground levels.

According to a further step of the described method, a cable may be introduced into a flexible outer hose of the cable assembly, whereby the cable preferably is a terrestrial cable. This step provides a benefit compared to using an armored sea cable according to the state-of-the-art because terrestrial cables are easier to manufacture than sea cables. Apart from that, a resistance against possibly damaging influences comparable to a conventional armor is provided by the flexible outer hose.

The step of introducing the cable into the flexible outer hose may be preferably carried through above the surface of the sea bed and more preferably above the water surface. This method is advantageous because it does not require divers or remotely operated vehicles. When using a method of pushing and pulling a cable into the flexible outer hose, this step can be applied after the steps of arranging the flexible outer hose of the cable assembly in the holding apparatus, of flushing the flexible outer hose into the seabed and of arranging it in a holding apparatus of a second offshore facility. The method of pushing and pulling a cable comprises at least the steps of introducing a messenger wire into the flexible outer hose, of pulling the cable into the flexible outer hose by means of the messenger wire and of pushing the cable into the flexible outer hose by means of a "push"-device known from prior art.

Other objects and features of the described aspects will become apparent from the following detailed descriptions considered in conjunction with the accompanying drawings. It is to be understood, however, that the drawings are designed solely for the purposes of illustration and not as a definition of the limits of the invention.

BRIEF DESCRIPTION

Some of the embodiments will be described in detail, with reference to the following figures, wherein like designations denote like members, wherein.

Figure 8:
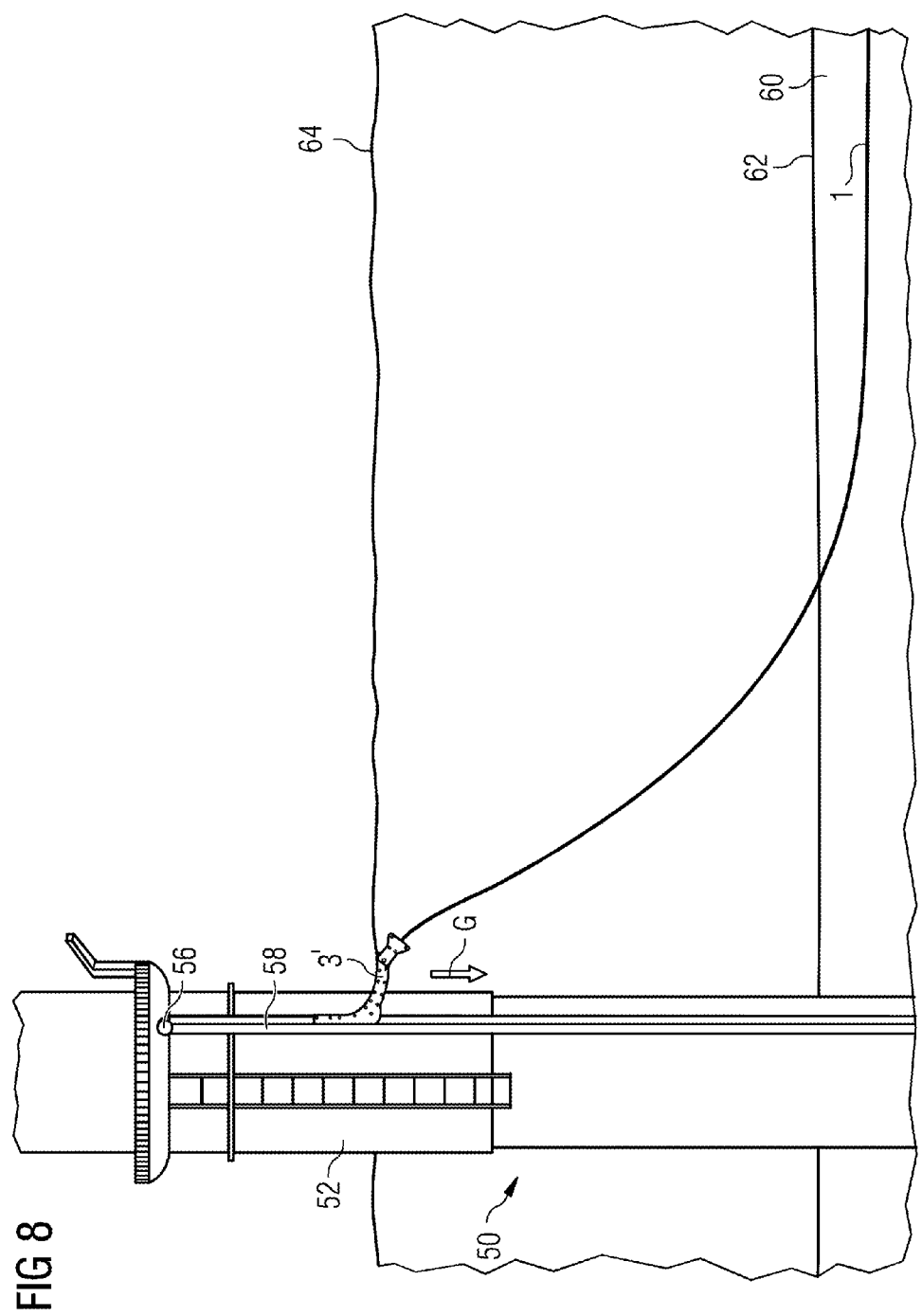

FIG. 8 shows a view of a step in the process of installing a cable assembly in a cable assembly support arrangement comprising a second embodiment of a curvature limiter at an offshore facility; and FIG. 9 shows a view of an advanced step in the process of installing a cable assembly in a cable assembly support arrangement comprising a second embodiment of a curvature limiter at an offshore facility.

Although the present invention has been disclosed in the form of preferred embodiments and variations thereon, it will be understood that numerous additional modifications and variations could be made thereto without departing from the scope of the invention.

DETAILED DESCRIPTION

Figure 1:
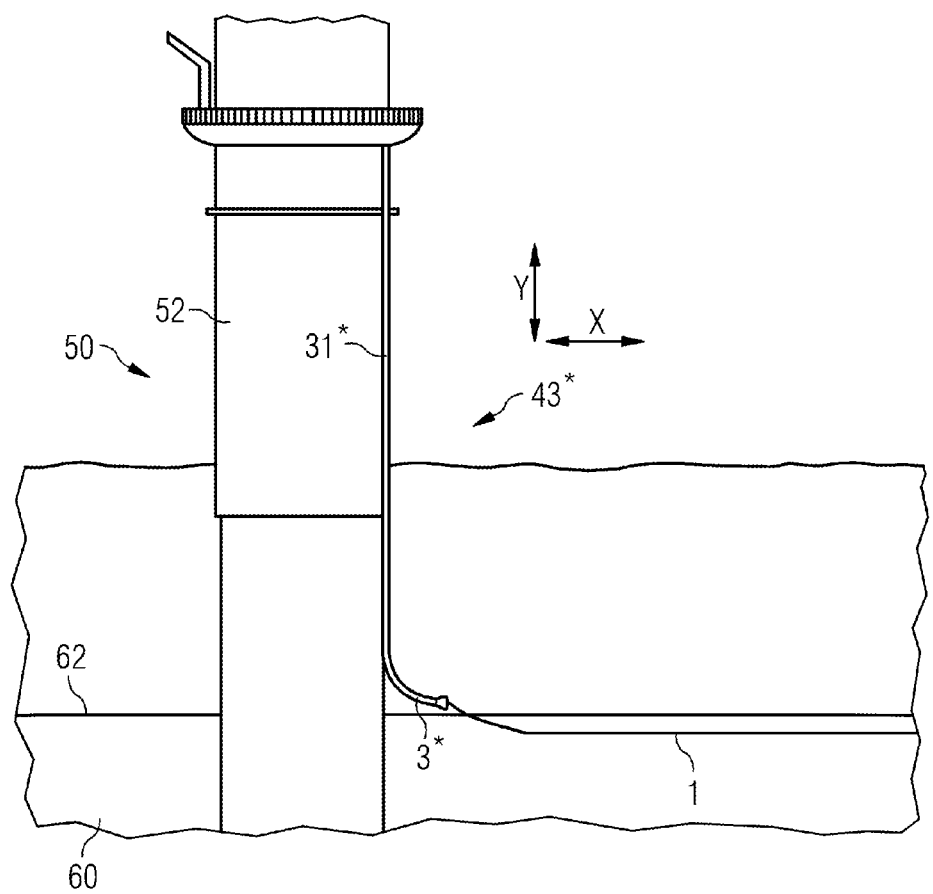
FIG. 1 shows a side view of a cable assembly support arrangement according to the state-of-the-art being arranged at an offshore facility.

FIG. 1 shows a view of a cable assembly support arrangement 43\* according to the state-of-the-art. A cable assembly holding apparatus 31\* is mounted to a pillar 52 of an offshore facility 50. At its bottom opening the cable assembly holding apparatus 31\* comprises a curvature limiter 3\* designed for bending a cable assembly 1 from a vertical direction Y to a horizontal direction X. The curvature limiter 3\* comprises a fixed curvature and a fixed bending angle of an inserted cable assembly 1. Such type of arrangement comprising a holding apparatus 31\* and a curvature limiter 3\* is known as a "J-tube". The bottom end of the curvature limiter 3\* is positioned on the surface 62 of the seabed 60 and comprises an opening where the cable assembly 1 exits the curvature limiter 3\* and proceeds to a level below the surface 62 of the seabed 60.

Figure 2:
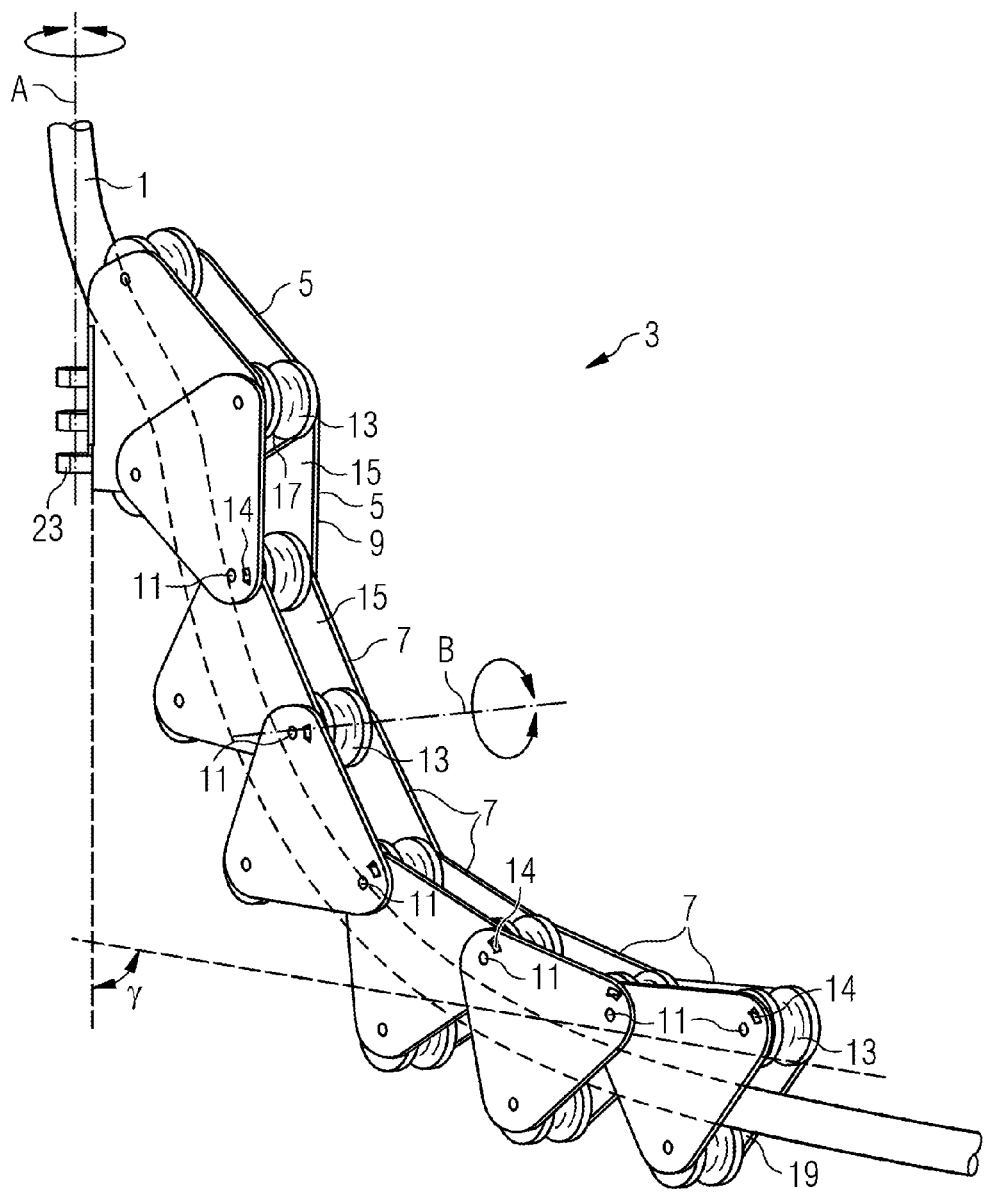
FIG. 2 shows a view of a cable assembly curvature limiter according to a first embodiment.

FIG. 2 shows a view of a first possible embodiment of a curvature limiter 3 for guiding a cable assembly 1, which curvature limiter 3 comprises a number of rigid segments 5 (in FIG. 2 two rigid segments are displayed) and a number of hinged segments 7, each of which hinged segments 7 can be twisted in a common plane, that is orthogonal to a rotation axis B. The rigid and hinged segments 5, 7 each comprise two essentially triangular shaped frame parts 9 which are connected to each other by three axes 11 mounted to three corner regions of the two triangular shaped frame parts 9. Each rigid segment 5 and each hinged segment 7 further comprises three rollers 13 mounted on the axes 11 connecting the frame parts 9. These axes 11 serve as rotation axes B of the rollers 13 and as rotation axes B of the hinged segments 7 when the hinged segments 7 are twisted against each other. The rotation angle of the hinged segments 7 is limited by stoppers 14. The maximum rotation angle for a rotation of two adjacent hinged segments 7 against each other is preferably lower than 30° and more preferably lower than 15°. Together with two inner surfaces 15 of the triangular shaped frame parts 9, one surface 17 of each roller 13, which surface 17 in a given position of the rollers 13 points to an inner side of the rigid segments 5 or hinged segments 7, form a cable assembly duct 19. In a cross-sectional view the rollers 13 display an H-shaped or U-shaped form preferably adapted to the outer form of the cable assembly. A "combined" rotation angle γ of a series of connected rigid segments 5 and hinged segments 7 determines the curvature of the curvature limiter 3 and thus a bending of a cable assembly 1 inserted in the curvature limiter 3. If the curvature limiter 3 comprises two rigid segments 5 and five hinged segments 7, which rigid segments 5 provide a bending angle of a cable assembly 1 of 20° and which hinged segments 7 can each be twisted about an angle of 15°, in addition of these values a maximum bending angle γ of a cable assembly 1 of 95° can be reached.

Figure 5:
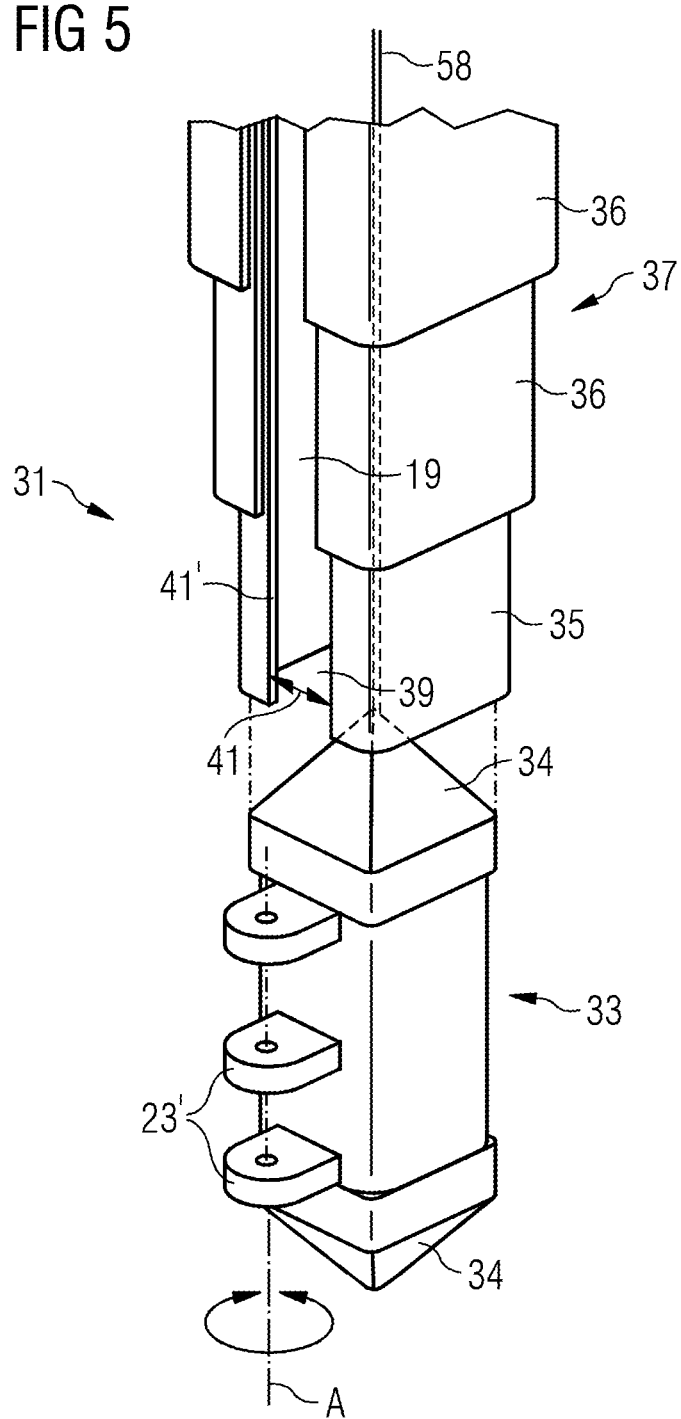
FIG. 5 shows a view of a part of a cable assembly holding apparatus.

A rigid segment 5 forming an end segment of the curvature limiter 3 comprises a connective interface 23 for mounting the curvature limiter 3 to a properly constructed pilot guide connective interface 23' (displayed in FIG. 5). The connective interface 23 comprises an arrangement for rotating the rigid segment 5 forming an end segment of the curvature limiter 3 and thus the curvature limiter 3 itself when the said rigid segment 5 is connected to a pilot guide. This rotation axis A lies preferably in a 90° angle related to the rotation axis B of the hinged segments 7 of the curvature limiter 3. A maximum rotation angle of the connective interface 23 of the curvature limiter 3 against the pilot guide connective interface 23' (not displayed in FIG. 2) about a rotation axis A is preferably less than 90° and more preferably less than 20°.

Figure 3:
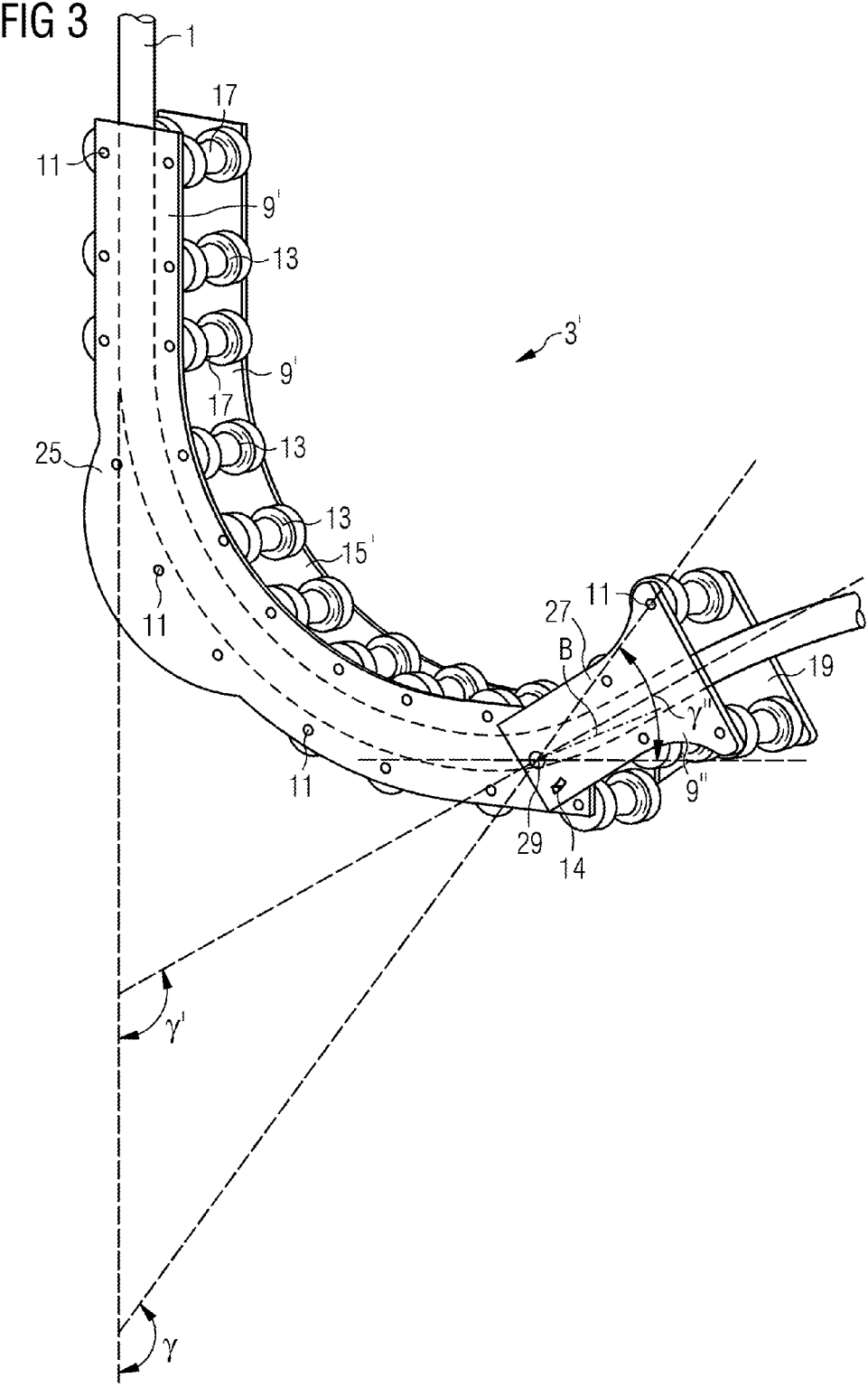
FIG. 3 shows a view of a cable assembly curvature limiter according to a second embodiment.

FIG. 3 shows a view of a second possible embodiment of a curvature limiter 3' for guiding a cable assembly 1, which curvature limiter 3' comprises a curved rigid segment 25 and a smaller hinged end segment 27. The hinged end segment 27 can be twisted about a rotation axis B. The curved rigid segment 25 comprises a pair of frame parts 9', the hinged end segment 27 comprises a pair of frame parts 9". These pairs of frame parts 9', 9" are interconnected by a number of axes 11. The curved rigid segment 25 and the hinged end segment 27 comprise rollers 13 mounted to the axes 11 connecting the two pairs of frame parts 9', 9". These axes 11 thus serve as rotation axes of the rollers 13. Together with two inner surfaces 15' of the frame parts 9', 9", a surface of each roller 13, which surface in a given position of the roller 13 points to an inner side of the curved rigid segment 25 or hinged end segment 27, forms a cable assembly duct 19. In a cross-sectional view the rollers 13 display an H-shaped form or U-shaped form preferably adapted to the outer form of the cable assembly. A bending angle γ' is defined by a main direction of a cable assembly 1 entering the curved rigid segment 25 relative to a main direction of the cable assembly 1 exiting a connected hinged end segment 27 of the curvature limiter 3', wherein the hinged end segment 27 is twisted upwards with a maximum rotation angle of preferably 20°. If the cable assembly 1 leaves a main direction and instead is bended upwards when exiting the hinged end segment 27, wherein its bending is limited by an upper roller 13 of the hinged end segment 27, a maximum bending angle γ of the cable assembly 1 inserted in the curvature limiter 3' is reached. In this position, the rotation angle γ" of the hinged end segment 27 relative to the curved rigid segment 25, which is limited by stoppers 14, preferably amounts to a maximum angle of about 20°. The bending angles γ, γ' determine the bending of a cable assembly 1 inserted in the curvature limiter 3'. The maximum bending angle γ is equivalent to the rotation angle γ"+90°. The width of the mouth of the hinged end segment 27 corresponds to the difference between a bending angle γ' and a maximum bending angle γ of a cable assembly 1 inserted into a cable assembly duct 19. The curvature limiter 3' can be mounted to an end opening of an open tube (35,36) or of a closed tube such that a cable assembly 1 exiting the lower opening of the tube enters a cable assembly duct 19 of the curvature limiter 3' preferably without being bended.

Figure 4:
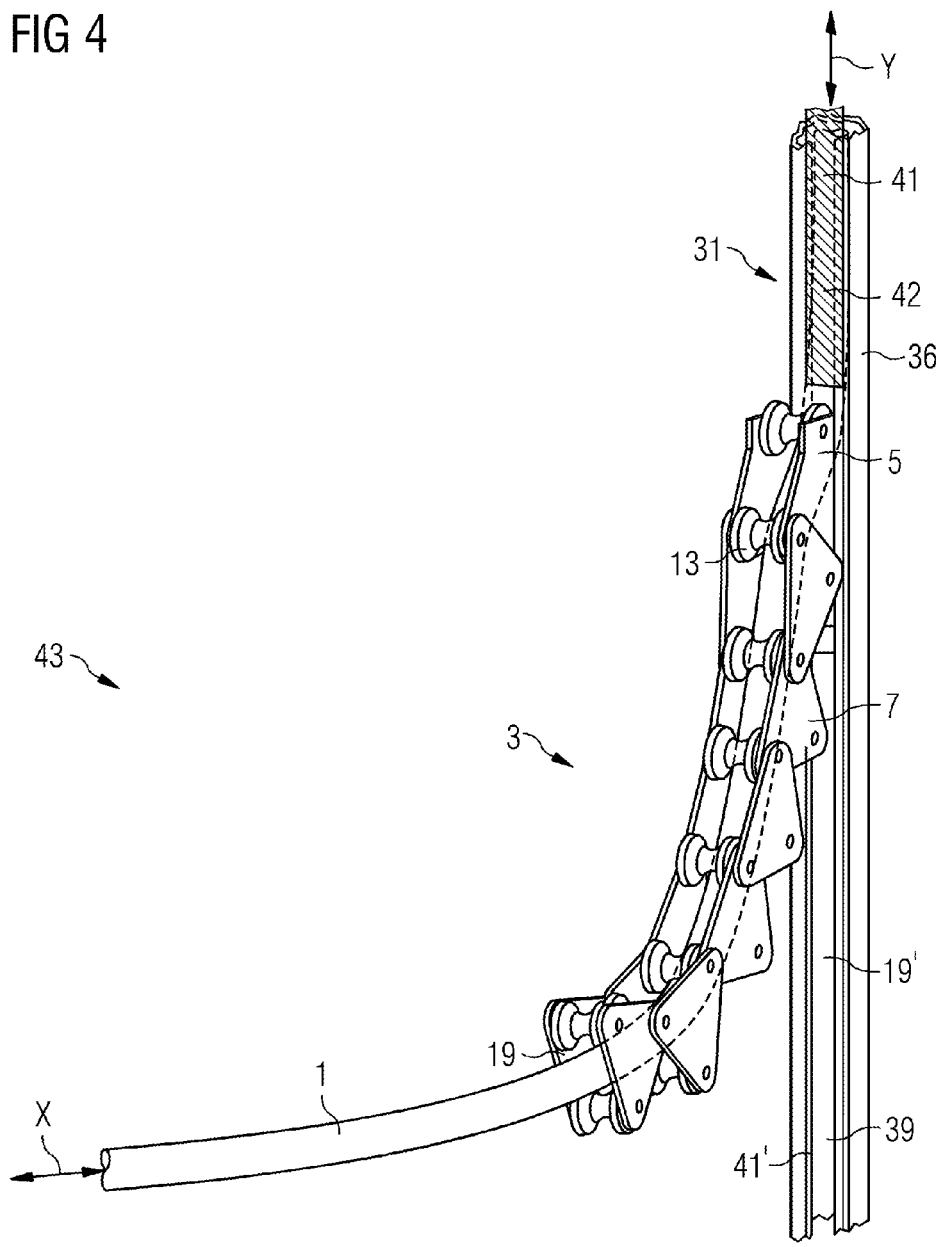
FIG. 4 shows a view of a part of an assembled cable assembly support arrangement.

FIG. 4 shows a view of a middle part of an assembled cable assembly support arrangement 43 comprising a cable assembly holding apparatus 31 and a curvature limiter 3 (according to the embodiment displayed in FIG. 2). A cable assembly 1 is inserted into a cable assembly duct 19, 19' of an open tube 36 of the cable assembly holding apparatus 31 and of the curvature limiter 3. The cable assembly 1 is thus supported on a course from a vertical direction Y to a horizontal direction X. An open tube 36 as part of a telescopic arrangement 37 comprises a longitudinal slit 41 whose edges 41' are deformable and preferably curved inwards into a cavity 39 of the open tube 36. A shield 42 which can for example be realized as a kind of a curtain covers a section of the longitudinal slit 41 of the open tube 36 and thus prevents the cable assembly 1 from slipping out of the cavity 39 of the open tube 36 respectively out of the cable assembly duct 19'. A rigid segment 5 of the curvature limiter 3 is connected to a pilot guide (hidden in the cavity 39 of the open tube 36).

FIG. 5 shows a view of a lower end part of a cable assembly holding apparatus 31 comprising a pilot guide 33 for moving a curvature limiter 3, 3' along a length of the cable assembly holding apparatus 31. The pilot guide 33 displays a size adapted to an innermost nested segment 35 of the set of open tubes 36 of the telescopic arrangement 37 being part of the cable assembly holding apparatus 31. The pilot guide 33 comprises a pyramidal section 34 at a top and a bottom part of it so that it can be moved easily up and down within the cavities 39 of each open tube 35, 36 constituting the telescopic arrangement 37. A wire 58 can be attached to a tip of the pyramidal sections 34 for altering the position of the pilot guide 33 within the cavities 39. Moreover, the pilot guide 33 comprises a pilot guide connective interface 23' for being connected to a connective interface 23 of the curvature limiter 3. The pilot guide connective interface 23' displays a size adapted to the width of a longitudinal slit 41 of the telescopic arrangement 37 of the cable assembly holding apparatus 31, which width is about 120 mm and hence large enough for inserting a cable assembly 1. The pilot guide connective interface 23' comprises an arrangement for rotating a connected curvature limiter 3. Further, the cavities 39 of the open tubes 36 of the telescopic arrangement 37 form a cable assembly duct 19' which comprises a longitudinal slit 41 on one side.

Figure 6:
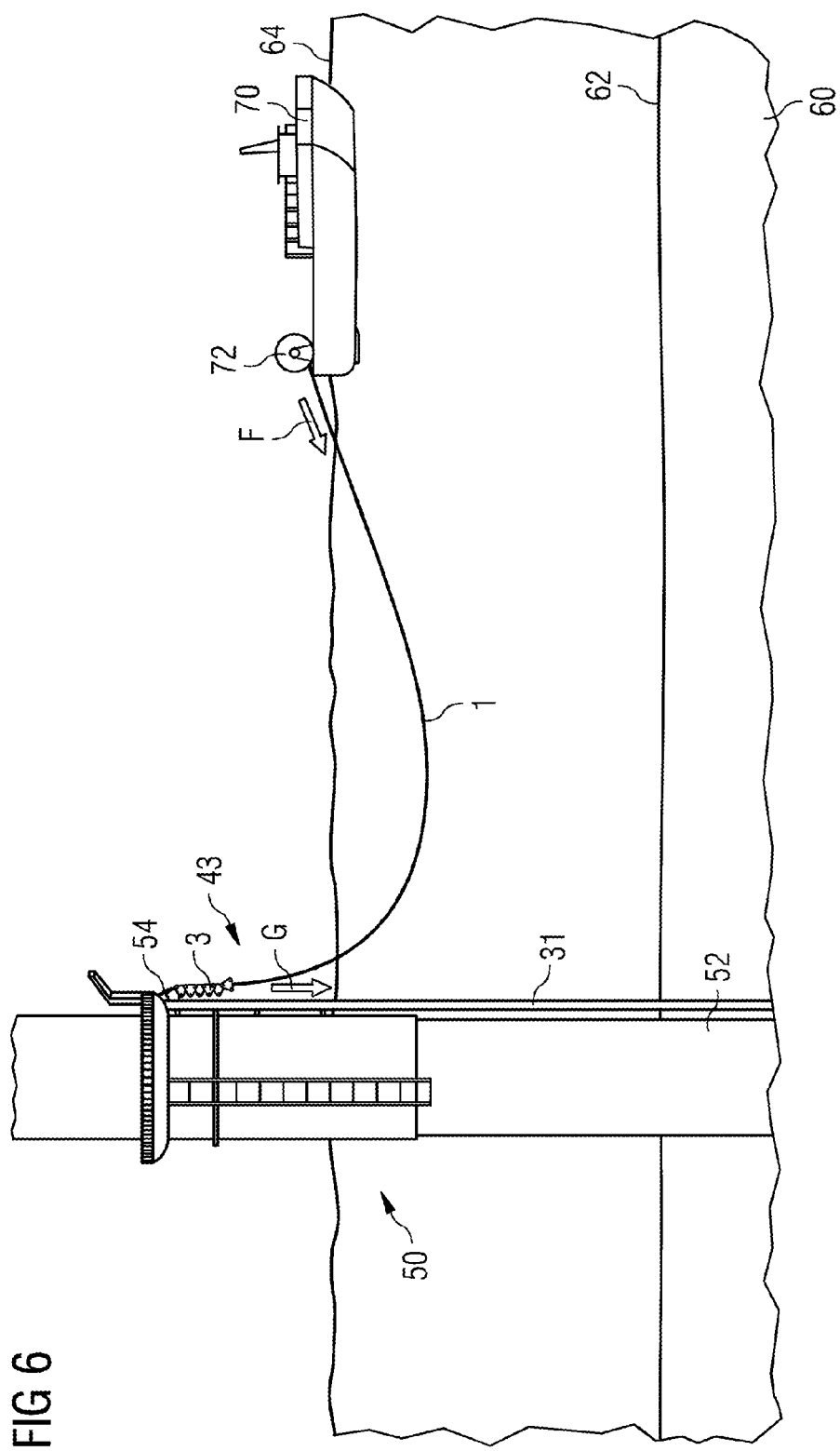
FIG. 6 shows a view of a step in the process of installing a cable assembly in a cable assembly support arrangement comprising a first embodiment of a curvature limiter at an offshore facility.

FIG. 6 shows a view of a step in the process of installing a cable assembly 1 to a cable assembly support arrangement 43 arranged at an offshore facility 50. This step is carried out before an end segment of a cable assembly 1 is installed on the seabed 60. The set of open tubes 36 of the cable assembly holding apparatus 31 is mounted to a pillar 52 of the offshore facility 50 and is then extended to a level below the surface 62 of the seabed 60. After that, a curvature limiter 3 is arranged at a top end of the set of open tubes 36, which position is at the same time a level above the water surface 64. A floating facility 70 comprising a cable assembly drum 72 is positioned near a pillar 52 of the offshore facility 50. The cable assembly 1 is being unrolled from the cable assembly drum 72 in a direction F. A first end segment of the cable assembly 1 is fixed at the offshore facility 50 at a fixing point 54 while a second end segment of the cable assembly 1 is deposed on board of the floating facility 70. Before fixing a cable assembly 1 at the fixing point 54, a segment of the cable assembly 1 is inserted into the curvature limiter 3. After that, the curvature limiter 3 is being moved downwards to the seabed in a direction G by means of a wire 58 controlled by a winch 56 (as displayed in FIG. 8).

Figure 7:
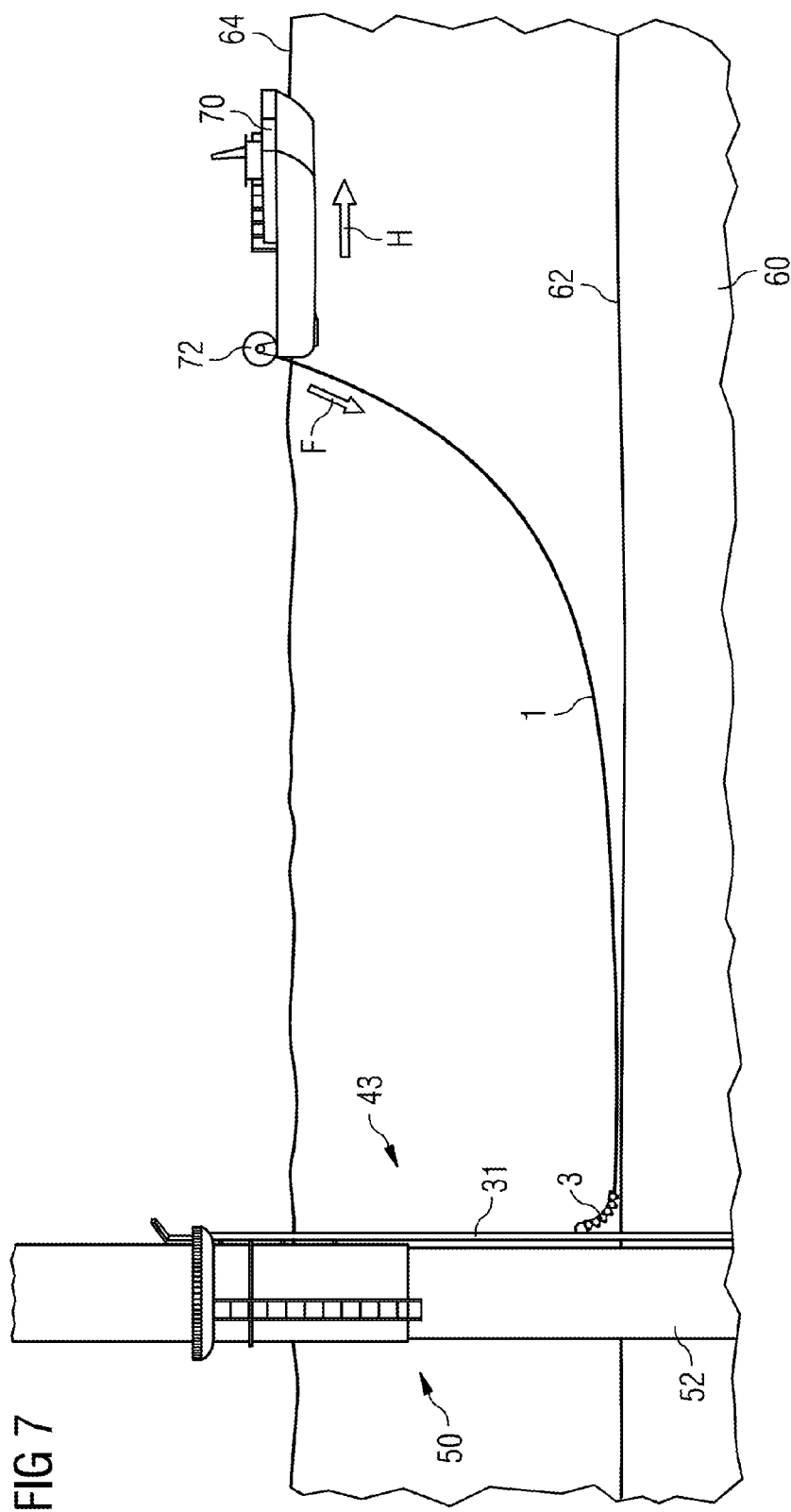
FIG. 7 shows a view of an advanced step in the process of installing a cable assembly according to FIG. 6.

FIG. 7 shows a view of an advanced step in the process of installing the cable assembly 1 to the cable assembly support arrangement 43 arranged at the offshore facility 50 according to FIG. 6. This step is carried out before an end segment of the cable assembly 1 is installed on the seabed 60. Here, the curvature limiter 3 has been positioned at a surface 62 of the seabed 60. The cable assembly 1 is further unrolled from a cable assembly drum 72 positioned at the floating facility 70 in a direction F. At the same time, the floating facility 70 moves away from the offshore facility 50 in a direction H, deposing the cable assembly 1 on the seabed 60.

FIG. 8 shows a view of a step in the process of installing a cable assembly 1 to a cable assembly support arrangement 43 arranged at an offshore facility 50 using a curvature limiter 3' according to FIG. 3. This step is carried out after a segment of the cable assembly 1 has been installed on or below a level defined by the surface 62 of the seabed 60 and after an end segment of the cable assembly 1 has been installed at a second offshore facility 50. Again, the curvature limiter 3' comprises an inserted cable assembly 1, whereby the step of insertion has been performed above a level defined by the water surface 64, and the curvature limiter 3' is transferred from a position above the water surface 64 towards the seabed 60 in a direction G. This movement is executed by means of a winch 56 and a wire 58 attached to the winch 56, to the curvature limiter 3 and to a bottom region of the pillar 52 of the offshore facility 50, similar to the process described above in connection with FIGS. 6 and 7.

FIG. 9 shows a view of a final step in a different process of installing a cable assembly 1 to a cable assembly support arrangement 43 arranged at an offshore facility 50. Here, the curvature limiter 3' is connected to a bottom end of a set of closed tubes comprising a telescopic mechanism. A cable assembly 1 inserted into a cavity of the set of closed tubes enters the cable assembly duct 19' of the curvature limiter 3' without being bended. The curvature limiter 3' is displayed being positioned on a level below the surface 62 of the seabed 60. Consequently, a lower opening of the curvature limiter 3' is positioned below the surface 62 of the seabed 60 so that the cable assembly 1 exiting the curvature limiter 3' proceeds on a level below the surface 62 of the seabed 60 as well. As displayed in FIG. 8, the curvature limiter 3' may be connected to a single open tube without a telescopic mechanism or alternatively to a set of open tubes firmly connected to each other at their open endings.

Although the present invention has been disclosed in the form of preferred embodiments and variations thereon, it will be understood that numerous additional modifications and variations could be made thereto without departing from the scope of the invention. For example, the curvature limiters 3, 3' described in the process according to FIGS. 6 and 7 may also be used in a process similar to FIG. 8 or 9 and vice versa. Also, individual parts of a specific curvature limiters 3, 3' (as described above), e. g. the hinged end segment 27 comprising a mouth, a segment with a connective interface 23, etc. can be used in connection with another curvature limiter in order to construct an amended type of curvature limiter. Further, a cable assembly 1 may also be removed or exchanged easily if the procedure described in connection with the mentioned figures is reversed to an opposite direction. Such reversed procedure can for example comprise the steps of moving the curvature limiter 3 upwards while at the same time rolling the cable assembly 1 onto a drum 72 of a floating facility 70.

For the sake of clarity, it is to be understood that the use of "a" or "an" throughout this application does not exclude a plurality, and "comprising" does not exclude other steps or elements.

The claims are as follows:

1. A cable assembly curvature limiter for limiting a curvature of a cable assembly in a transition from an essentially vertical direction to an essentially horizontal direction, the cable assembly curvature limiter comprising a flexible open frame comprising:

a plurality of interconnected hinged segments each having a pair of spaced apart frame parts, wherein the pair of spaced apart frame parts form a first of the plurality of interconnected hinged segments and are joined to a pair of spaced apart frame parts from a second of a plurality of interconnected hinged segments with a common roller for accommodating the cable assembly and a number of retaining elements within the flexible open frame arranged to retain the cable assembly within the curvature limiter.

2. The curvature limiter according to claim 1, comprising a variable curvature, wherein a minimum radius of curvature of the curvature limiter is at least as great as a minimum bending radius of the cable assembly, wherein the minimum bending radius is a minimum angle between a main direction of a first section of a curvature limiter and a main direction of a last section of a curvature limiter.

3. The curvature limiter according to claim 2, wherein the minimum bending radius of the cable assembly is 1 meter.

4. The curvature limiter according to claim 1, wherein a degree of freedom between adjacent hinged segments is chosen to limit the curvature of the cable assembly.

5. The curvature limiter according to claim 1, comprising at least six, interconnected hinged segments, wherein adjacent hinged segments are connected such that one hinged segment can rotate at most 30 relative to the other hinged segments.

6. The curvature limiter according to claim 4, wherein the hinged segments comprise triangular frame sections connected to adapt to a curvature of the cable assembly, which comprises a radius greater than a minimum bending radius of the cable assembly.

7. The curvature limiter according to claim 1, wherein a retaining element comprises a roller for facilitating a movement of the cable assembly accommodated in the curvature limiter.

8. The curvature limiter according to claim 4, wherein a hinged segment comprise at least two retaining elements.

9. An offshore facility comprising a cable assembly curvature limiter according to claim 1 for limiting the curvature of a cable assembly in a transition from a vertical direction to a horizontal direction.

10. The curvature limiter according to claim 2, wherein the minimum bending radius of the cable assembly is 1.5 meters.

11. The curvature limiter according to claim 2, wherein the minimum bending radius of the cable assembly is 1.7 meters.

12. A cable assembly curvature limiter for limiting a curvature of a cable assembly in a transition from an essentially vertical direction to an essentially horizontal direction, the cable assembly curvature limiter comprising a flexible open frame defined by a curved rigid segment, wherein the curved rigid segment is a curvature of the curved rigid segment which is at least as great as a minimum bending radius of the cable assembly to be accommodated in the curvature limiter for accommodating the cable assembly and a number of retaining elements within the flexible open frame arranged to retain the cable assembly within the curvature limiter.

13. The curvature limiter according to claim 12, comprising a hinged segment connected to an ending of the curved rigid segment, which hinged segment is rotatable relative to the curved rigid segment such that a bending radius of the cable assembly at a lower end of the curvature limiter is at least as great as a minimum bending radius of the cable assembly.

14. The curvature limiter according to claim 12, wherein the curved rigid segment is a bending angle of the cable assembly accommodated within the curved rigid segment is at least 0°.

15. A cable assembly curvature limiter for limiting a curvature of a cable assembly in a transition from an essentially vertical direction to an essentially horizontal direction, the cable assembly curvature limiter comprising a flexible open frame defined by one of a plurality of interconnected hinged segments and a rigid curved segment for accommodating the cable assembly and a number of retaining elements within the open frame arranged to retain the cable assembly within the curvature limiter, wherein a connective interface for mounting the curvature limiter to a supporting structure of an offshore facility and/or to a cable assembly holding apparatus for vertically supporting a cable assembly.

16. A method of guiding a cable assembly from an essentially vertical direction to an essentially horizontal direction for suspending a cable assembly from an upper level of an offshore facility, the method comprising:
connecting a cable assembly curvature limiter to an essentially vertical structure on the offshore facility, wherein the curvature limiter comprises a flexible open frame for accommodating the cable assembly and a number of retaining elements within the open frame arranged to retain the cable assembly within the curvature limiter; and
arranging the cable assembly in the curvature limiter, wherein the step of arranging the cable assembly in the curvature limiter is carried out at an upper level of the offshore facility and the step of connecting a cable assembly curvature limiter to the offshore facility comprises the steps of lowering the curvature limiter and the cable assembly to a seabed and of arranging the curvature limiter at the seabed.

17. A cable assembly curvature limiter for limiting a curvature of a cable assembly in a transition from an essentially vertical direction to an essentially horizontal direction, the cable assembly curvature limiter comprising a flexible open frame defined by a plurality of interconnected triangular hinged segments connected to adapt to a curvature of the cable assembly, the curvature comprising a radius greater than a minimum bending radius of the cable assembly and a number of retaining elements within the open frame arranged to retain the cable assembly within the curvature limiter.

* * * * *